THICKNESS RATIO = $\frac{t_b}{t_f}$ $t_b$ = THICKNESS OF BEAD $t_f$ = THICKNESS OF FILM

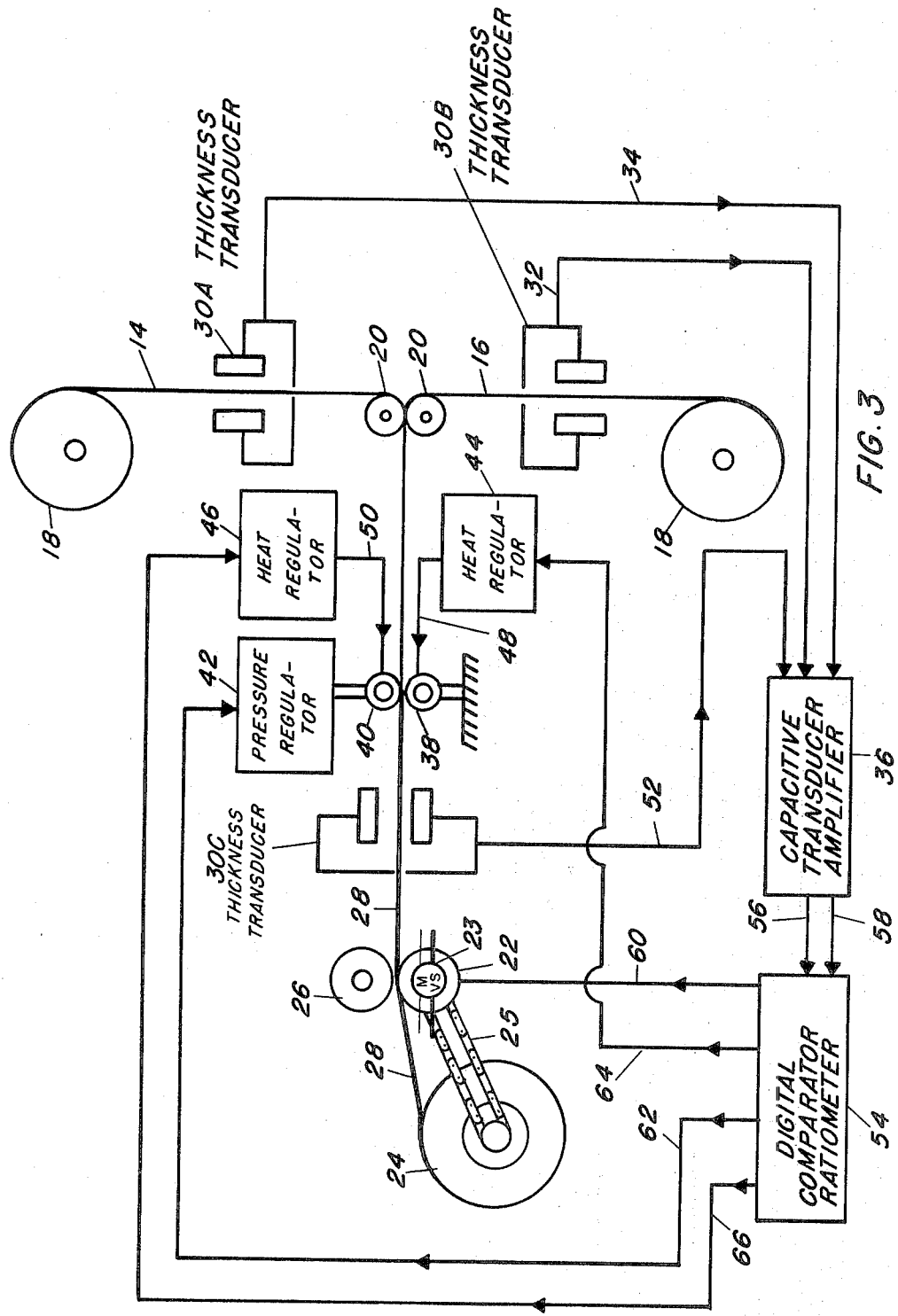

United States Patent Office 3,826,701
Patented July 30, 1974

3,826,701
CONTROLLABLE HEAT SEALING PROCESS FOR OPTIMUM SEAL STRENGTH
Donald Miller, Rockaway, N.J., assignor to the United States of America as represented by the Secretary of the Army
Filed Oct. 31, 1972, Ser. No. 302,457
Int. Cl. G01b 5/06
U.S. Cl. 156—64                 4 Claims

ABSTRACT OF THE DISCLOSURE

A method for sealing thermoplastic film materials to obtain optimum seal strength is achieved by automatically varying seal making parameters in response to a pre-established seal bead to film thickness ratio for a given seal efficiency. A combination of thickness sensing transducers, amplifier, ratiometer and variable speed motor is used to maintain and control the bead making process within a selected seal efficiency to thickness ratio range. The present process for heat sealing thermoplastic materials controls seal efficiency by non-destructive testing of the seal bead and film material and continuous control of the process.

GOVERNMENTAL INTEREST

The invention described herein may be manufactured, used and licensed by or for the Government for governmental purposes without the payment to me of any royalty thereon.

BACKGROUND OF THE INVENTION

Various means have been used in prior art to determine the strength of plastic heat seals made in a continuous process. These prior art methods are generally based upon destructive tests performed on sample sections of the sealed material after a batch of material has been processed. After the test the equipment is manually changed to effect the bead making conditions to provide the best seal. The prior art method of destructive testing of samples was time consuming and ineffective because by the time the sample sections of bead seal were tested, the need for changing the processing conditions might have changed drastically because of change in film thickness and/or film material etc.

The present method of controllable heat sealing of thermoplastic film materials, which is done while the seal is being made, results in lower cost and higher quality by continuously monitoring the bead to film thickness ratio and constantly changing the conditions effecting the making of the seal as a result of the measurement thereof.

SUMMARY OF THE INVENTION

The present invention relates to a new and improved method of continuously controlling bead thickness in a heat sealing process used in joining together thermoplastic film materials. The process makes use of the principle that the strength of a heat seal is directly related to the thickness of the bead formed during the heat sealing operation. The heat seal bead thickness and the individual film thicknesses of an adjoining section of material are measured and their ratio established. The heat seal is usually weaker than the film. The closer the seal strength is to the film strength, the stronger is the seal. The seal efficiency is the ratio of the heat-seal strength to the film strength.

One of the objects of this invention is to provide a method for heat sealing thermoplastic films with optimum seal strength.

Another object of this invention is to provide a method for automatically controlling the seal bead thickness as a function of seal efficiency during the seal making operation. Another object of this invention is to provide a method for testing thermoplastic heat seals non-destructively.

For a better understanding of the present invention, together with other and further objects thereof, reference is made to the following description taken in connection with the accompanying drawings.

BRIEF DESCRIPTION OF THE DRAWINGS

FIG. 3 is a diagrammatic sketch showing the steps and sequence of the process and apparatus used in performing the present controllable heat sealing process.

DESCRIPTION OF THE PREFERRED EMBODIMENT

Figure 1:
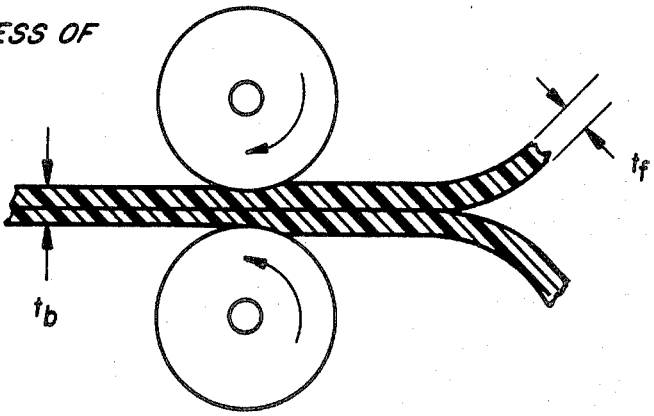
FIG. 1 is a partial cross-sectional view of a thermoplastic film seal showing where the thickness of the seal bead $t_b$ and the thickness of the film $t_f$ is measured in order to calculate the thickness ratio $$t_R = \frac{t_b}{t_{f1} + t_{f2}}$$
Figure 2:
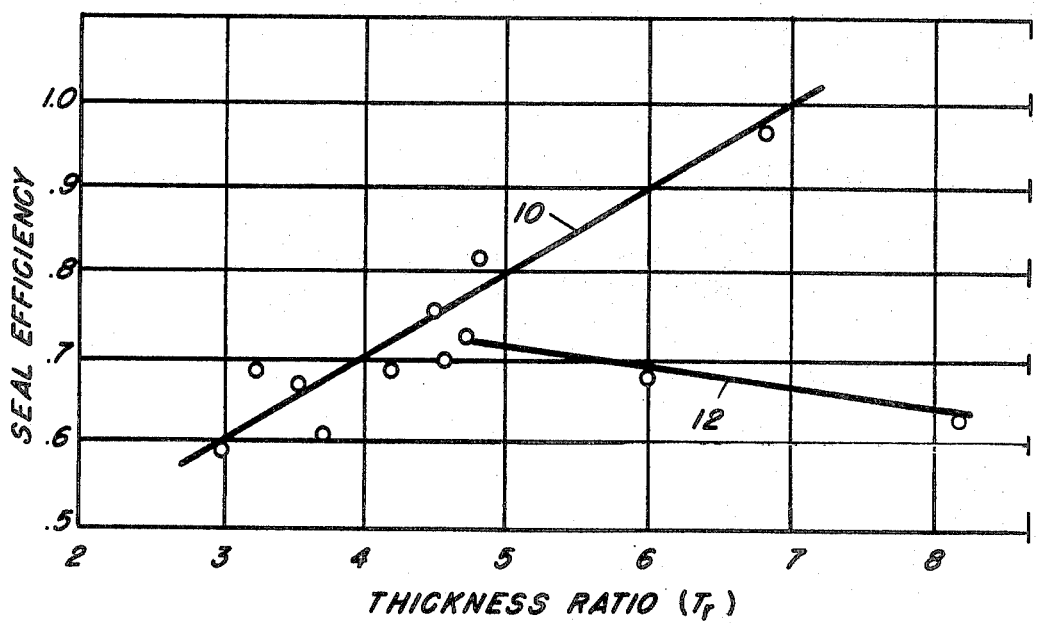
FIG. 2 is a plot of seal efficiency versus thickness ratio $T_R$ for both "good heat sealing" and "bad heat sealing" for a .004 inches polyethylene film having a density of .919 and a melt-index of 1.79. The melt-index was determined by using ASTM Specification D 1238–62, Measuring Flow Rates of Thermoplastics by Extrusion Plastometer, Condition E.

Referring now to FIGS. 1 and 2 the seal efficiency versus thickness ratio curves show a positive slope for a "good heat sealing" curve 10 and a negative slope curve 12 for "poor heat sealing." In the good heat sealing curve 10 the specimens are sealed within a temperature range of 240 to 415° F. The negative slope, poor heat sealing, curve 12 results when the specimens are heat sealed within a temperature range of 415° to 475° F. The reason for a negatively sloping curve above 415° F. lies in the fact that there is a high amount of material degradation above this temperature for this particular type of thermoplastic material.

Referring now to the controllable heat sealing process shown in FIG. 3, a first thermoplastic film 14 and a second thermoplastic film 16 are simultaneously drawn from feed rolls 18 by the variable speed motor 23 which drives both the drive roller 22 and the rewinder roller 24. The heat sealed film 28 is taken up by the rewinder 24 which is coupled to the drive roll 22 through a chain drive 25. The idler drive roller 26 is operatively positioned above the driver roller 22 so that the proper amount of friction is exerted between the bead sealed film 28 and the driver roller 22 to withdraw the films 14 and 16 off the feed rolls 18 at the desired speed. Two thickness transducers 30A and 30B, such as or equivalent to those manufactured by Wayne Kerr and distributed by Southfield Electronics of Southfield, Mich., Model MB1, are positioned respectively intermediate rollers 18 and 20. The outputs of these single film thickness transducers 30A and 30B are electrically coupled by electrical conductors 32 and 34 to the input of a capacitive transducer amplifier 36 such as or equivalent to Model TE200 manufactured by Wayne Kerr. After the film 14 and 16 pass over rollers 20 they are fed through the sealing rolls 38 and 40. Sealing roller 38 is rotatably fixed and spaced underneath the movable sealing roller 40. Sealing roller 40 is operatively connected to pressure regulator 42. Sealing rollers 38 and 40 are heated by the heat regulators 44 and 46 respectively through electrical conductors 48 and 50. A third thickness transducer 30C is disposed intermediate drive rollers 20, 26 and sealing rollers 38, 40 for the purpose of continuously measuring the thickness of the bead seal 28. The output signal of the bead thickness transducer 30C is electrically connected to the capacitive transducer amplifier 36 by lead 52. The output signal, of the amplifier 36, generated by the bead transducer 30C is electrically connected to the digital comparator ratiometer 54, by lead connector 56. An output signal which is a function of the sum of the film thickness of the transducers 30A and 30B is coupled to the ratiometer 54 by lead 58. A digital comparator 54 such as or equivalent to Model 3200 manufactured by Atec Inc., 1125 Lumpkin St., Houston, Tex., is programmed on the basis of prior acceptable limits for the bead to film thickness ratio for the material being sealed, to deliver an output signal as a function of this ratio to the variable speed motor 23 through electrical connector 60, and/or to pressure regulator 42 through electrical connector 62, and/or to the heat regulators 44 and 46 through electrical connectors 64 and 66 respectively.

In addition to the aforementioned automatic method of control the heat sealing temperature and pressure provided may be manually adjusted or made fixed or variable as a part of the thickness control circuit. The control system as illustrated by symbols 36 and 54 may be a computerized Extruder Control unit such as or equivalent to the unit manufactured by Harrel, Inc. of East Norwalk, Conn.

In the process thermoplastic films 14 and 16 are unwound from separate feed rolls 18 and directed by rollers 20 through thickness testing transducers 30A and 30B. The idler rolls 20 position the film 14 and 16 and the driver and idler driver rolls 22 and 26 draw the film through sealing rolls 38 and 40 which are heated by heat regulators 44 and 46. The third thickness gage 30C measures the thickness of the film seal bead. The output of the thickness transducers 30A, 30B and 30C is amplified by the capacitive transducer amplifier 36 whose output reflects the combined output of the film thickness transducers 30A and 30B as a single integrated first signal and the output of the bead thickness transducer 30C as a second output signal. The digital comparator ratiometer 54 determines whether the ratio between the bead thickness and film thickness signal is within pre-calculated established limits. If the aforementioned limit is exceeded, the sealing time is adjusted by a signal fed to the variable speed motor 23, keeping the heat regulator and pressure regulator controls constant. In like manner with the sealing time and pressure regulator settings constant the comparator 54 can be made to vary the amount of heat delivered to rollers 38 and 40 as a function of the thickness ratio ($T_R$), and in a similar manner with sealing time and heat regulation settings constant the pressure regulator 42 can be varied as a function of the thickness ratio.

For additional information with regard to this invention see an article by the applicant entitled "How To Test Heat Seals Without Destroying the Package" in the November 1971 issue of Package Engineering.

The foregoing disclosure and drawings are merely illustrative of the principles of this invention and are not to be interpreted in a limiting sense. I wish it to be understood that I do not desire to be limited to the exact detail of construction shown and described for obvious modifications will occur to a person skilled in the art.

Having thus fully described the invention, what is claimed as new and desired to be secured by Letters Patent of the United States is:

1. A controllable heat sealing process for joining together a plurality of thermoplastic films in a bead seal having optimum strength which comprises:
   measuring the thickness of each of said plurality of thermoplastic films;
   generating a first electrical signal in response to the sum of said measured thickness;
   drawing said measured films through sealing rollers;
   forming said drawn films into a sealed bead;
   measuring the thickness of said formed bead;
   generating a second electrical signal in response to said measured bead thickness; and
   generating control signals in response to the ratio of said first and second electrical signals and relative to a prior established limit for regulating the bead thickness.

2. A controllable heat sealing process as recited in claim 1 wherein said step of generating control signals comprises:
   maintaining the heat applied and the pressure exerted during said forming step constant; and
   regulating the speed of said drawn film.

3. A controllable heat sealing process as recited in claim 2 wherein said step of generating control signals comprises:
   maintaining the heat applied, during said forming step, and the speed of said drawn film constant; and
   regulating the pressure exerted during said forming step by said sealing rollers.

4. A controllable heat sealing process as recited in claim 3 wherein said step of generating control signals comprises:
   maintaining the pressure exerted during said forming step and the speed of said drawn film constant; and
   regulating the heat applied.

References Cited
UNITED STATES PATENTS

| | | | |
|---|---|---|---|
| 3,444,732 | 5/1969 | Robbins et al. | 156—64 X |
| 3,510,374 | 5/1970 | Walker | 156—360 X |
| 3,743,562 | 7/1973 | Phipps | 156—64 X |

EDWARD G. WHITBY, Primary Examiner

U.S. Cl. X.R.

156—306, 358, 359, 360, 378